United States Patent

[11] 3,596,806

| [72] | Inventor | Jonas C. Harschel<br>8 Mariposa Court, Burlingame, Calif. 94010 |
|---|---|---|
| [21] | Appl. No. | 845,166 |
| [22] | Filed | July 28, 1969 |
| [45] | Patented | Aug. 3, 1971 |

[54] DISPENSING CONTAINER FOR PROPORTIONALLY DILUTING CONTENTS
8 Claims, 11 Drawing Figs.

[52] U.S. Cl. .................................................. 222/190, 222/356, 222/425
[51] Int. Cl. ...................................................... B67d 5/56
[50] Field of Search ........................................ 222/190, 320, 356, 425

[56] References Cited
UNITED STATES PATENTS

| 744,939 | 11/1903 | Reynolds | 222/356 X |
| 907,274 | 12/1908 | Neureuther | 222/356 |
| 1,372,328 | 3/1921 | Adams | 222/356 |
| 1,916,326 | 7/1933 | McAnulty | 222/356 |
| 2,403,299 | 7/1946 | Pickin | 222/356 X |

*Primary Examiner*—M. Henson Wood, Jr.
*Assistant Examiner*—Michael Y. Mar
*Attorney*—Julian Caplan ABSTRACT: A container has a tube slidable through its neck when the cover is lifted. The bottom of the tube has a cup of a selected capacity which is filled with the liquid in the container when the tube is pushed to the bottom of the container. Above the top edge of the cup the tube is apertured so that as it is raised above the liquid level surplus liquid is drained from the cup. The neck of the container and tube interfit to seal off the tube from the container when the tube is in raised position and also to seal off the apertures in the tube. A diluent (e.g. water) may be poured in to fill the tube. Thus a fixed quantity of liquid and fixed quantity of diluent are measured and may be mixed and dispensed. A cap closes off the tube and container neck when the device is not in use.

PATENTED AUG 3 1971

INVENTOR.
JONAS C. HARSCHEL
BY Julian Caplan
ATTORNEY

PATENTED AUG 3 1971 3,596,806
SHEET 2 OF 2
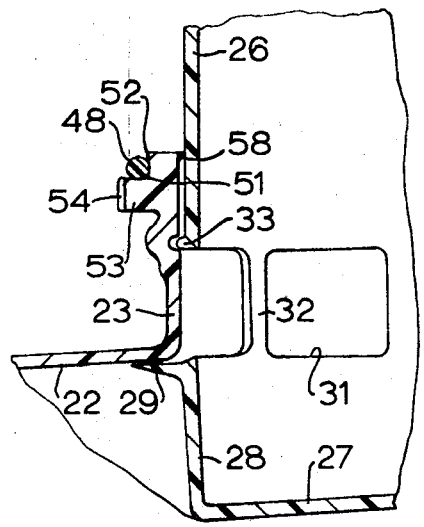
FIG. 6
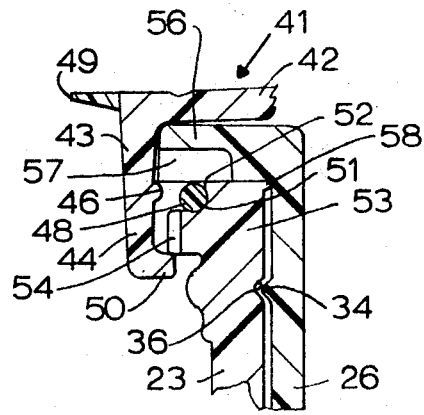
FIG. 7
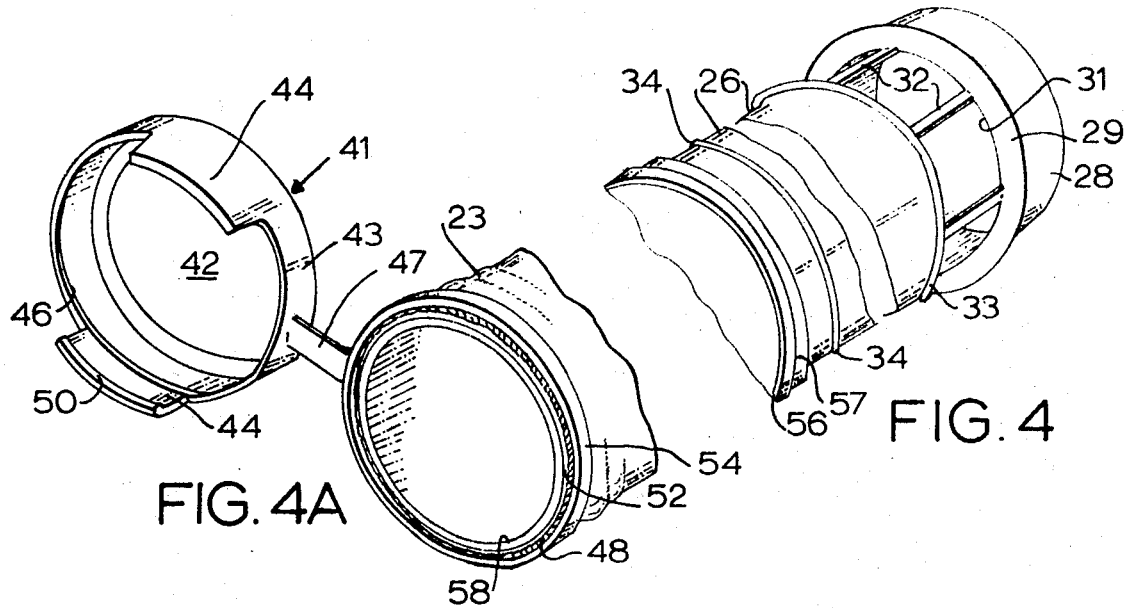
FIG. 4A
FIG. 4
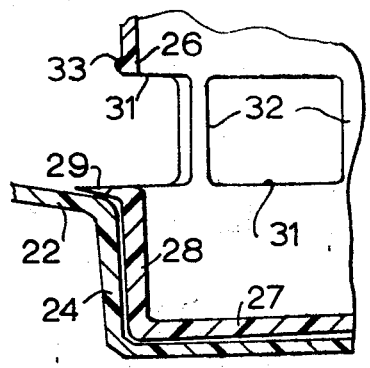
FIG. 5
INVENTOR.
JONAS C. HARSCHEL
BY
Julian Caplan
ATTORNEY

DISPENSING CONTAINER FOR PROPORTIONALLY DILUTING CONTENTS

A principal object of the invention is to provide a container having means to measure a fixed quantity of a first liquid, to provide a mixing chamber which holds a fixed quantity of second liquid and in which the two liquids may be mixed and from which the mixed liquids may be dispensed. The means is retractable within the container between uses and a single cap closes both the container and the means for measuring.

A typical example of a product by which the present invention may be merchandised is hair rinse which is customarily sold in concentrated form. The user is required to measure a small quantity of the conditioner and to mix the same with a larger quantity of water. Heretofore such use has required measuring a quantity of the conditioner and pouring it into a larger bowl or the like and adding water in a measured amount. The operation has been cumbersome and time consuming and the possibility of improper proportioning is always present. Measuring devices and a mixing bowl are required and their storage between uses is a problem. The present invention eliminates the undesirable features of prior means for merchandising such products. It will be understood that the present invention may be applied to merchandising a wide variety of other products.

A further feature of the invention is the reduction in the cost of expensive boxes previously required to hold both the liquid container and the mixing devices. In accordance with the present invention, the mixing device is retractable within the container. This makes it possible to sell the container without an additional enclosing box. The label material may be applied directly to the container. Thus the necessity of merchandising the product in a liquidtight container which is in turn enclosed within a larger box is eliminated.

Another important advantage of the invention is the fact that it enables the user to operate the device while holding the same in the hands. It is not necessary to set any part of the apparatus down while measuring or mixing. This feature is particularly useful when showering since frequently convenient surfaces on which to rest mixing bowls and the like are not available. In accordance with the present invention one hand holds the device during all phases of its use.

Another advantage of the invention is the fact that it is formed of as few as two parts, which may be plastic molded. The parts interfit and are connected together so that it is not necessary to separate the same and to hold or set down a cap, bowl, or mixing spoon or any other portion of the apparatus when using the same or between uses.

Another advantage of the invention is the fact that a single cap closes off both container and the mixing device.

The mixing device of the present invention is preferably a tube which slides within the neck of the container and incorporates means for measuring the product and also for the diluent. So long as the containers have the same neck size and the same height, a single tube may be used in containers of different capacities or different design shapes. Accordingly, the manufacturing costs are reduced.

Another advantage of the invention is the fact that the container may be filled with product and the dispensing tube and cap installed after filling. Thus conventional filling apparatus may be employed and the dispensing tube and cap applied later. Also the same container without the tube may be used for related merchandise.

Still another advantage is the fact that the container while displayed on the retailer's shelf stands out from competitive containers because of its shape as well as the visible dispensing tube and aperture, which gives the contents an attractive and interesting appearance.

Other objects of the present invention will become apparent upon reading the following specification and referring to the accompanying drawings in which similar characters of reference represent corresponding parts in each of the several views.

In the drawings:

FIG. 4 is an enlarged perspective view of the dispensing tube.

FIG. 4A is a perspective view of the cap which fits on the container, and a portion of a container neck to which it is attached.

FIG. 5 is an enlarged fragmentary sectional view of a portion of the container and tube with the latter in fully retracted position.

FIG. 6 is an enlarged fragmentary sectional view of a portion of the container and tube showing the tube in fully extended position.

FIG. 7 is an enlarged sectional view of portions of the cap, container and tube showing the latter in fully retracted position.

Figure 3:
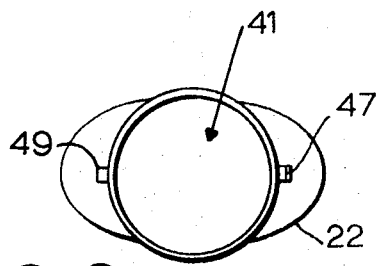
FIG. 3 is a top plan view.
Figure 1:
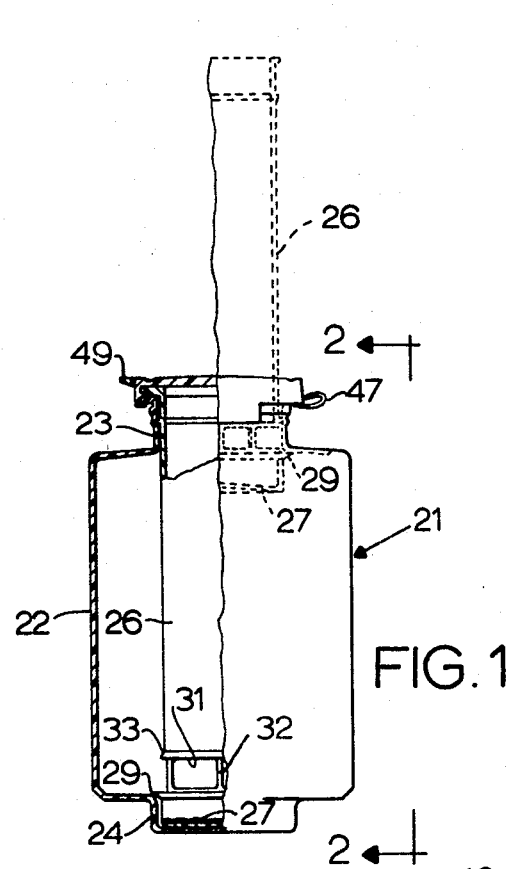
FIG. 1 is a side elevational view of the container of the present invention partly broken away in section to reveal internal construction and showing the dispensing tube in retracted position in solid lines and in extended position in dot and dash lines.
Figure 2:
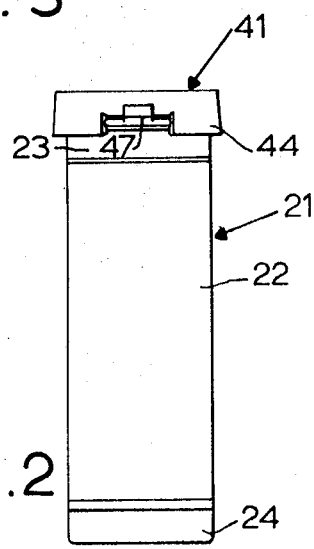
FIG. 2 is a side elevation of the structure of FIG. 1.

Container 21, as well as the other parts of the device which is the subject of this invention, may be formed of a plastic material such as polyethylene or other suitable substance. The container has a main body portion 22 of convenient shape and capacity. The other parts of the invention may be installed in bodies of different sizes provided the inside diameter of the neck 23 which extends up from the top of the body are identical and the overall height of the body coincides with the length of the tube. Preferably the container 21 at the bottom has a well 24 or depression so that all of the contents of the container may be dispensed more conveniently.

Slidable within neck 23 is a tube 26. The top of tube 26 is open but the bottom 27 is closed. Extending up from bottom 27 is a shallow, substantially cylindrical wall 28 which fits within well 24. Extending out from the top edge of wall 28 is a tapered flange 29 which, in the retracted position of the tube, rests on the bottom of body 22. The flange 29 is flexible enough so that tube 26 may be forced into the container 21 at the time of assembly of the parts of the present invention but once it is inside the container it prevents the tube from being removed by application of normal forces. Immediately above flange 29, tube 26 is formed with a plurality of windows 31 having their bottom edges at the same level, the windows being separated by vertical mullions 32. The portion of tube 26 below window 31 comprises a cup of predetermined capacity. Thus in a common usage, the cup would have a 1-tablespoon volume. When the tube is in the fully retracted position of FIG. 5, or below the surface of the liquid, liquid in container 21 flows into the bottom of tube 26, thus filling the cup. When the tube is being extended, the windows 31 are eventually raised above the level of the liquid in the container and all surplus liquid above the top edge of the cup drains out into the container. Cup 26 is formed with a bottom bead 33 around its periphery immediately above windows 31 and a top bead 34 spaced downward from its upper edge. The interior of neck 23 is formed with a matching groove 36. When bead 34 seats in groove 36, tube 26 is held in retracted position. When bead 33 seats in groove 36, tube 26 is held in extended position.

It will be observed particularly with reference to FIG. 6 that when tube 26 is in fully extended position flange 29 seats against the body 22 of the container and hence the interior of tube 26 is effectively sealed from communication with the interior of container 21. Hence if a diluent is poured into the top of tube 26, a fixed quantity of diluent is measured, said measurement being the total capacity of the tube below top bead 34 less the capacity of the cup at the bottom of the tube. By selecting proper dimensions of the parts of tube 26, a fixed quantity of diluent is measured. By gently shaking the tube, the two liquids may be mixed. The force of water entering the tube, for example, the spray of a shower bath, may satisfactorily mix the two liquids without shaking. The mixed liquids are then dispensed by pouring out of the open top of the tube.

Various means may be used to cap the tube and container and several such means are illustrated and are hereinafter described. In a preferred form best shown in FIGS. 7 and 4A, a cap 41 is used having an impervious top disc 42 and a depending cylindrical skirt 43 having on opposite sides downward skirt extensions 44 of an arcuate length of about 70°. At the bottom edge of skirt 43 is a peripheral internal bead 46. On the bottom edges of extensions 44 are inward directed secondary beads 50. Projecting radially from skirt 46 midway between extensions 44 is a narrow strap hinge 47 which is connected at its opposite end to a round ring 48, which holds the cap on the container as hereinafter explained. Opposite hinge 47 is a finger hold 49 used to lift the cap 41 off the neck 23.

The upper end of neck 23 is formed to accommodate cap 41. Thus at the top of neck 23 is a reduced external diameter portion formed with a groove 51 which receives ring 48. Immediately above groove 51 is a retainer bead 52 which holds the ring 48 in place. Thus once the ring 48 is installed, the cap 41 remains attached to neck 23. Below groove 51, neck 23 is formed with an external peripheral flange 53. In the area of flange 53 opposite depending skirt projection 44, the flange is formed with an additional extension 54. The bead 50 of cap 41 snaps under extension 54 when the cap is closed.

The upper end of tube 26 is likewise formed with an external peripheral flange 56 which projects out further than flange extension 54 so that bead 46 snaps under flange 56. To facilitate withdrawing tube 26, indentations 57 are formed at spaced intervals on the underside of flange 56 so that the fingernails of the user may be inserted and used to pull the tube up relative to neck 23.

To prevent leakage of the ingredients of the container 21, a wiping bead 58 may be formed on the upper edge of neck 23 bearing against the outside of tube 26 and thus sealing the same relative to neck 23.

Figure 8:
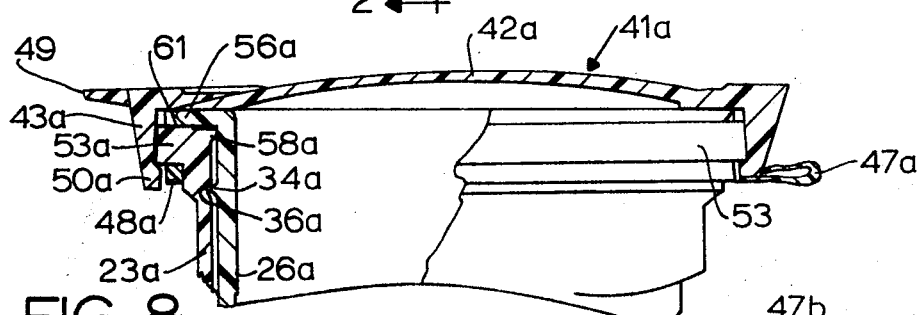
FIG. 8 is a sectional view of a portion of the cap, container and tube of a modified construction.

An alternate cap structure is illustrated in FIG. 8. In many respects the structure of FIG. 8 is similar to that of the preceding modification and the same reference numerals followed by the subscript *a* are used to designate corresponding parts. In this form of the invention, flange 56*a* of tube 26*a* seals against the top of neck 23*a* and to facilitate such sealing action, the lip 61 on the top of neck 23*a* is raised. Cap 41*a* has a domed central disc 42*a* which gives the cap flexibility. In this version of the invention, the skirt 43*a* of the cap is formed with an internal bead 50*a* which engages under flange 53*a* of the neck and holds the cap in place. In closing the cap 41*a*, the user depresses the same above the skirt 43*a* until the bead 50*a* snaps under flange 53*a*. This seals the underside of the disc 42*a* to the top of flange 56*a* and seals the underside of flange 56*a* to rim 61. When it is desired to open the cap 41*a* the user pulls up on fingerhold 49*a* causing disengagement of the flange 53*a* from bead 50*a*.

Figure 10:
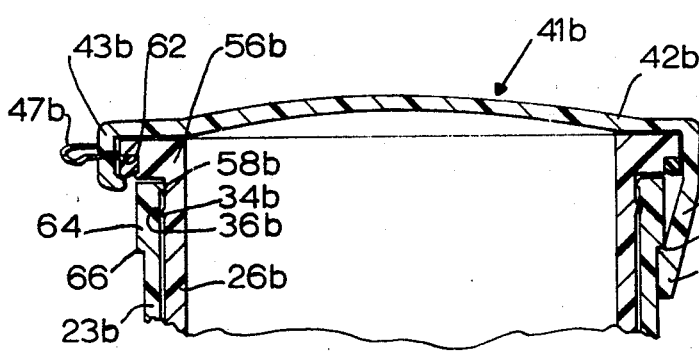
FIG. 10 is a fragmentary enlarged sectional view of the modification of FIG. 9.
Figure 9:
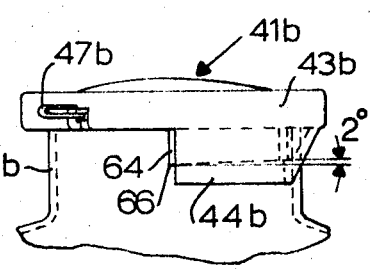
FIG. 9 is a side elevation of a portion of the cap and neck of the container of an additional modified construction.

FIGS. 9 and 10 illustrate a twist-lock cap 41*b*. Many of the parts resemble those in the previous modification and the same reference numerals followed by the subscript *b* are used to designate corresponding elements. In this version of the invention cap 41*b* is attached to the upper end of tube 23*b*. For such purpose, the underside of flange 56*b* on the upper end of tube 23*b* is formed with a groove 62 which receives ring 48*b* of the cap. Hinge 47*b* attaches ring 48*b* to the skirt 43*b*. The peripherally spaced skirt extensions 44*b* are formed with inwardly turned locking projections 63. On the exterior of neck 23*b* are corresponding external locking lugs 64. The undersides 66 of lugs 64 are slanted at an angle such as about 2°. In closing the cap 41*b*, the cap is turned so that lugs 44*b* are displaced relative to lugs 64 in a counterclockwise direction. The cap is then fully depressed so that flange 56*b* fits against the underside of disc 42*b* and the cap is then twisted in a clockwise direction causing the projection 63 to engage under the surfaces 66. Because of the slanted surfaces 66 as the cap is turned it is more tightly engaged with the neck 23*b*. To permit twisting of the cap, hinge 47*b* is made sufficiently long and flexible, or the ring 48*b* may turn around the neck.

Generally speaking, the cap may be attached to the container neck or to the tube, as by a hinge strap which slips over the neck or tube. Alternatively, the tube and cap and a connecting hinge strap may be formed integrally. The cap may engage the neck or tube by snap beads, by twist lugs, by threads or by other means.

I claim:

1. A measuring, mixing and dispensing device comprising a container having a neck, a tube slidable in said neck with a close fit between retracted and extended positions and having an open top end and a closed bottom end, said tube formed with at least one aperture spaced upward from said bottom end so that said bottom and the imperforate portion of said tube below said aperture form a cup of predetermined capacity, a peripheral flange, said flange dimensioned to seal against the top of said container immediately below said neck to seal off said tube and said neck from communication with the inside of said container when said tube is in extended position and also to restrain outward movement of said tube relative to said neck, whereby said aperture is closed by said neck when said tube is in extended position, and a cap closing said tube and neck from the atmosphere when said tube in is in retracted position.

2. A device according to claim 1, which further comprises cooperating means on said tube and neck detachably holding said tube in extended position.

3. A device according to claim 1, in which the bottom of said container is formed with a depressed well dimensioned to receive said cup with said aperture at the level of said bottom of said container outward of said well.

4. A device according to claim 1, in which said neck is formed at its upper end with an external first flange having a first smooth finish on its upper surface, said tube is formed with a peripheral second flange having a second smooth finish on its bottom surface to seal against said first finish when said tube is retracted in said container, said cap having a depending skirt fitting outside both said flanges and formed with an inturned portion adapted to engage under said first flange.

5. A device according to claim 4, in which said skirt is formed with an internal bead positioned to engage under said second flange when said cap is closed.

6. A device according to claim 4, in which said second flange is relieved on its underside to provide access for the fingers to lift said tube from retracted position.

7. A device according to claim 4, in which the inside of said neck is formed with a wiping bead engaging the exterior of said tube to wipe liquid off said tube as said tube is extended.

8. A device according to claim 1, in which said tube is formed with a peripheral external flange sealing against the top end of said neck when said tube is fully retracted in said container, said cap having flexible means attaching said cap to said tube and a depending skirt having internal first locking lugs, said neck having external second locking lugs, one of said lugs having slanted surfaces engaging mating surfaces on the other said lugs whereby when said cap is closed and twisted said lugs engage to hold said cap sealed against the top of said external flange of said tube.